R. T. PEARCE.
JOURNAL BEARING.
APPLICATION FILED MAY 21, 1904.

1,021,846.

Patented Apr. 2, 1912.

Witnesses:

Inventor:
Robert T. Pearce
By Rector & Hibben
His Attorneys

UNITED STATES PATENT OFFICE.

ROBERT T. PEARCE, OF MONTCLAIR, NEW JERSEY, ASSIGNOR TO H. W. CALDWELL & SON COMPANY, OF CHICAGO, ILLINOIS, A CORPORATION OF ILLINOIS.

JOURNAL-BEARING.

1,021,846.  Specification of Letters Patent.  Patented Apr. 2, 1912.

Application filed May 21, 1904. Serial No. 209,056.

*To all whom it may concern:*

Be it known that I, ROBERT T. PEARCE, a citizen of the United States, residing at Montclair, in the county of Essex and State of New Jersey, have invented certain new and useful Improvements in Journal-Bearings, of which the following is a description, reference being had to the accompanying drawings, forming part of this specification.

My invention relates more particularly to journal bearings for "concentrators" for belt conveyers and has for its object the improved construction of such bearings, all as hereinafter more fully described and particularly pointed out in the claims.

Figure 1:
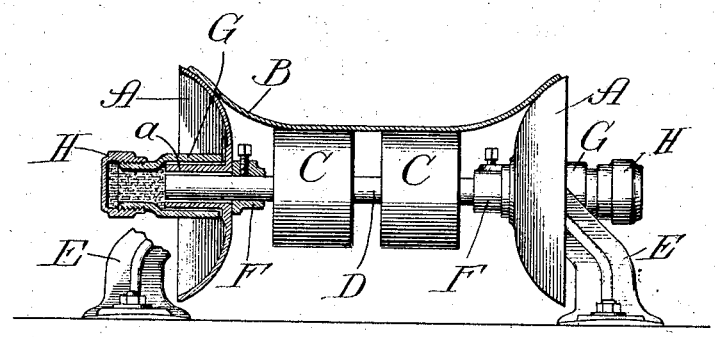
Figure 2:
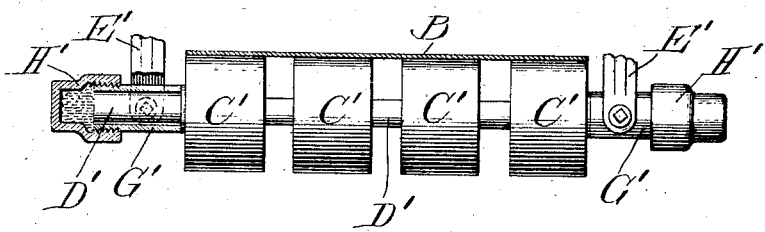

In the accompanying drawings Figure 1 is an elevation, partly in section, of a concentrator for a belt conveyer, embodying my invention, being one of the concentrators upon which the upper loaded side of the belt rests and travels; and Fig. 2 a corresponding view of the complementary support for the lower or return side of the belt.

In Fig. 1, A A represent the "dishpans" or "bells" which serve to support the opposite edges of the conveyer belt B, while C C are flat-faced pulleys upon which its middle portion travels, the relative diameters of these outer and middle supports for the belt being such as to give it the proper sag or concavity to retain the material carried by it. The pulleys C C are fast upon the shaft D, which is journaled at its opposite ends in journal boxes or bearings G G carried by (and in the present instance formed integral with) supporting brackets E E. These journal boxes and associated parts are similar in construction, one being shown in section and the other in elevation. The bells A A are loose upon the shaft D, being held from lateral play thereon by set collars F F which confine them between the collars and the inner ends of the journal boxes G G. The bells A A are provided with outwardly extended hubs *a* which fit between the ends of the shaft D and the boxes G G. The shaft D thus has its immediate bearings in the hubs *a* of the bells A A, while the latter, in turn, have their bearings in the fixed journal boxes G G carried by the supporting brackets. Owing to the relatively small diameter of the pulleys C C they will necessarily be given more revolutions by the conveyer belt than will be the bells A A supporting the outer edges of said belt; and as the pulleys C C are fast upon the shaft D the latter will turn at greater speed than the hubs *a* of said bells, in which the shaft has its bearings, but as the bells are turning in the same direction, as the pulleys and shaft, at a slower speed, the relative movement of the shaft in its bearings (*i. e.*, the hubs *a*), will be simply that due to the difference in speed of the shaft and hub, and therefore much less than if the shaft were directly journaled in fixed bearings. The construction described also provides the bells A A with comparatively large bearing surfaces in the fixed journal boxes G G, with the advantages incident thereto. The journal boxes G G are open at their outer as well as their inner ends, and are exteriorly threaded to receive screw caps H H having somewhat extended engagement with the ends of the boxes, so that after being first applied to the ends of the boxes they may be screwed inward thereon for a considerable distance. These caps H H constitute grease cups, and by filling them, as well as the interior of the journal boxes, with lubricant, before applying the caps, such lubricant may be forced inward between the shaft and the hubs of the bells, and between the hubs and the journal boxes, to lubricate said bearings. The extended threaded engagement of the caps or grease cups with the journal boxes will permit said caps to be screwed farther inward from time to time, to supply additional lubricant to the bearings as needed. When they have reached their limit of inward movement they can be removed and refilled with lubricant, and re-applied to the ends of the boxes, and the bearings thus be kept supplied with lubricant. The foregoing construction and arrangement of parts thus not only affords improved bearings for the ends of the shaft and for the bells, but greatly facilitates their lubrication.

On the lower support for the belt B shown in Fig. 2, there are four flat-faced pulleys C' secured to the shaft D', which is journaled at its opposite ends in tubular boxes or bearings G' G' carried by depending brackets E'. The outer ends of the boxes G' G' are exteriorly threaded to receive caps H' which form grease cups to hold a supply of lubricating material, and by which such material may be forced inward to lubricate the bearings, as before stated.

It will of course be understood that the number of pulleys employed upon the shafts D and D' depends upon the width of the conveyer belt. Where more than two are employed upon the shaft D it is not essential that they shall all be fast upon the shaft. Thus, if three be employed, the two outer ones may be made fast to the shaft and the middle one left loose, or the middle one may be made fast and the outer ones left loose. Likewise, while I preferably employ the set collars F for holding the bells A in position on the shaft D, said shaft may itself be provided with shoulders for that purpose and the set collars be dispensed with, or the pulleys C C may have extended hubs of sufficient length to abut against the bells A and take the place of the set collars.

Having thus fully described my invention I claim:

1. In a concentrator bearing, a journal box, a bell whose hub extends into and has its bearing in said journal box, and a shaft having its bearing in the hub of the bell; substantially as described.

2. A concentrator bearing comprising supporting brackets, journal boxes formed integral with said brackets, bells having outwardly extending hubs fitting in the journal boxes, a shaft journaled at its opposite ends in the hubs of the bells, and set collars on the shaft.

3. The herein described concentrator bearing comprising supporting brackets openended journal boxes formed integlral herewith, bells having outwardly extended hubs journaled in the boxes, a shaft journaled at its opposite ends in the hubs of the bells, set collars on the shaft and caps secured upon the outer end of the journal boxes.

4. In a device of the class described, the combination of a bearing open at both ends, a bell having a hollow hub rotatively mounted in the bearing, a shaft having its bearing in the hub of the bell and carrying a pulley of less diameter than the bell, the outer end of the bearing forming a packing box communicating with the space between the hub of the bell and the bearing and between the hub of the bell and the shaft respectively, and a cap for closing the outer end of the bearing.

5. In a belt conveyer, a pair of journal boxes, bells having hubs fitting in said boxes, a shaft journaled at its opposite ends in said hubs, and pulleys upon said shaft of less diameter than said bells; substantially as described.

ROBERT T. PEARCE. [L. S.]

Witnesses:
 EDWARD P. PHILLIPS,
 RALPH P. PHILLIPS.